United States Patent
Chen et al.

(10) Patent No.: US 10,952,116 B2
(45) Date of Patent: Mar. 16, 2021

(54) COMMUNICATION SYSTEM

(71) Applicant: NEC Corporation, Tokyo (JP)

(72) Inventors: Yuhua Chen, London (GB); Vivek Sharma, London (GB); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/032,211

(22) PCT Filed: Oct. 27, 2014

(86) PCT No.: PCT/JP2014/079009
§ 371 (c)(1),
(2) Date: Apr. 26, 2016

(87) PCT Pub. No.: WO2015/064728
PCT Pub. Date: May 7, 2015

(65) Prior Publication Data
US 2016/0277987 A1 Sep. 22, 2016

(30) Foreign Application Priority Data
Nov. 1, 2013 (GB) .................................... 1319382

(51) Int. Cl.
*H04W 36/24* (2009.01)
*H04L 5/00* (2006.01)
(Continued)

(52) U.S. Cl.
CPC .......... *H04W 36/24* (2013.01); *H04B 17/382* (2015.01); *H04L 5/0035* (2013.01);
(Continued)

(58) Field of Classification Search
CPC .......... H04W 36/0044; H04W 76/066; H04W 76/00; H04W 76/15; H04W 36/24;
(Continued)

(56) References Cited

U.S. PATENT DOCUMENTS 9,155,121 B2* 10/2015 Rayavarapu .......... H04W 76/19
9,338,711 B2*  5/2016 Wu .................... H04W 36/0005
(Continued)

FOREIGN PATENT DOCUMENTS

JP    2013-520096 A    5/2013
JP    2014-212572 A    11/2014
(Continued)

OTHER PUBLICATIONS

Broadcom Corporation: "Mobilityrobustness with dual connectivity",3GPP Draft; R2-133531, 3rd Generation Partnership Project (3GPP), Mobile Competence Centre ; 650, Route Des Lucioles ; F-06921 Sophia-Antipolis Cedex ; France, vol. RAN WG2, no. Ljubljana, Slovenia; Oct. 7, 2013-Oct. 11, 2013 Sep. 28, 2013 (Sep. 28, 2013).*

(Continued)

*Primary Examiner* — Asghar H Bilgrami

(57) ABSTRACT

A communication system is disclosed, in which a mobile telephone communicates user data substantially simultaneously via a first base station and a second base station of the communication system. The mobile telephone detects a problem in communications with the second base station and transmits, to the first base station on detection of a problem in communications with said second base station, an indication of the detected problem in communications with the second base station.

11 Claims, 6 Drawing Sheets

(51) Int. Cl.
  H04W 36/00  (2009.01)
  H04W 76/15  (2018.01)
  H04B 17/382 (2015.01)
  H04W 36/30  (2009.01)
  H04W 76/34    (2018.01)
  H04W 88/06    (2009.01)
  H04W 92/20    (2009.01)

(52) U.S. Cl.
  CPC ....... H04L 5/0085 (2013.01); H04W 36/0044 (2013.01); H04W 36/0069 (2018.08); H04W 76/15 (2018.02); H04L 5/001 (2013.01); H04L 5/0044 (2013.01); H04W 36/305 (2018.08); H04W 76/34 (2018.02); H04W 88/06 (2013.01); H04W 92/20 (2013.01)

(58) Field of Classification Search
  CPC ............. H04W 36/0069; H04L 5/0035; H04L 5/0085; H04L 5/001; H04B 17/382
  See application file for complete search history.

(56) References Cited

U.S. PATENT DOCUMENTS

| | | | |
|---|---|---|---|
| 2011/0268085 A1 | 11/2011 | Barany et al. | |
| 2012/0281548 A1* | 11/2012 | Lin ........................ | H04W 76/18 370/242 |
| 2013/0176988 A1* | 7/2013 | Wang .................... | H04W 28/08 370/331 |
| 2014/0056243 A1* | 2/2014 | Pelletier ................ | H04W 74/04 370/329 |
| 2015/0111580 A1* | 4/2015 | Wu ..................... | H04W 36/0005 455/436 |
| 2015/0117183 A1* | 4/2015 | Heo ...................... | H04W 76/18 370/228 |
| 2016/0135102 A1* | 5/2016 | Gunnarsson .......... | H04W 24/02 455/437 |
| 2016/0242064 A1* | 8/2016 | Lee ....................... | H04W 24/10 |
| 2016/0249259 A1* | 8/2016 | Park ...................... | H04W 36/00 |
| 2016/0285716 A1* | 9/2016 | Pelletier ................ | H04L 5/0098 |
| 2018/0123739 A1* | 5/2018 | Yi ............................. | H04L 1/08 |

FOREIGN PATENT DOCUMENTS

| | | | |
|---|---|---|---|
| JP | 2018-29353 | * | 2/2018 |
| JP | 2018-29353 A | | 2/2018 |
| JP | 2018-33172 A | | 3/2018 |
| WO | 2013/091161 A1 | | 6/2013 |
| WO | 2013/117009 A1 | | 8/2013 |
| WO | 2014/029429 A1 | | 2/2014 |
| WO | 2016/084865 A1 | | 6/2016 |

OTHER PUBLICATIONS

Kyocera: "RLF issues in dual-connectivity", 3GPP Draft; R2-133503_DUALC0NN_RLF, 3rd Generation Partnership Project (3GPP), Mobile Competence Centre ; 650, Route Des Lucioles ; F-06921 Sophia-Antipolis Cedex ; France, vol. RAN WG2, no. Ljubljana, Slovenia; Oct. 7, 2013-Oct. 11, 2013 Sep. 28, 2013 (Sep. 28, 2013), XP05.*
3rd Generation Partnership Project; Technical Specification Group Radio Access Network; "Evolved Universal Terrestrial Radio Access (E-UTRA); Radio Resource Control(RRC); Protocol specification" (Release 11) 3GPP TS 36.331 V11.5.0, Sep. 2013.
3rd Generation Partnership Project;Technical Specification Group Radio Access Network; "Evolved Universal Terrestrial Radio Access (E-UTRA); Medium Access Control(MAC) protocol specification" (Release 11) 3GPP TS 36.321 V11.3.0, Jun. 2016.
3rd Generation Partnership Project;Technical Specification Group Radio Access Network; "Evolved Universal Terrestrial Radio Access (E-UTRA); Study on Small Cell Enhancements for E-UTRA and E-UTRAN-Higher layer aspects" (Release 12), 3GPP TR 36.842 V0.2.0, May 2013.
Kyocera: "RLF issues in dual-connectivity", 3GPP Draft; R2-133503 Dualconn RLF. 3rd Generation Partnership Project(3GPP). vol. RAN WG2. no. Ljubljana. Slovenia; Oct. 7, 2013-Oct. 11, 2013 Sep. 28, 2013. XP050719218. p. 1-p. 4.
Broadcom Corporation: "Mobility robustness with dual connectivity". 3GPP Draft; R2-133531. 3rd Generation Partnership Project (3GPP). vol. RAN WG2. no. Ljubljana. Slovenia; Oct. 7, 2013-Oct. 11, 2013, Sep. 28, 2013. XP050719243. figures 1.2, p. 1-p. 3.
3rd Generation Partnership Project; Technical Specification Group Radio Access Network; "Evolved Universal Terrestrial Radio Access (E-UTRA); Study on Small Cell Enhancements for E-UTRA and E-UTRAN—Higher layer aspects" (Release 3GPP Standard; 3GPP TR 36.842. vol. RAN WG2. No. V0A.0., Oct. 21, 2013. pp. 1-52. XP050769478. p. 23-p. 38.
Intel Corporation, "Radio link failure handling for dual connectivity", 3GPP TSG RAN WG2, Draft; R2-133498, Ljubljana. Slovenia, Oct. 2013.
International Search Report for PCT Application No. PCT/JP2014/079009 , dated Apr. 21, 2015.
English translation of Written opinion for PCT Application No. PCT/JP2014/079009.
3GPP TSG-RAN WG2 Meeting #81bis, "Mobility Statistics for Macro and Small Cell Dual-Connectivity Cases", R2-131056, Agenda item: 7.2, Nokia Siemens Networks, Nokia Corporation, Apr. 15-19, 2013, Chicago.
Japanese Office Action for JP Application No. 2016-526956 dated May 24, 2017 with English Translation.
Samsung, "RLF Procedure for LTE-NR Interworking", 3GPP TSG-RAN WG2 NR#97bis, Apr. 3-7, 2017, R2-1703018, total 3 pages.
Samsung, "SCG Failure Handling", 3GPP TSG-RAN, WG2#NR_AdHoc#2 Meeting, Jun. 27-29, 2017, R2-1707091, total 4 pages.
Communication dated Mar. 12, 2019 from Japanese Patent Office in counterpart JP Application No. 2018-037184.
Communication dated Jul. 2 , 2019 from the Japanese Patent Office in application No. 2018-037184.
Fujitsu, "Clarification on the UE reported timer in MRO", 3GPP TSG-RAN WG3 Meeting #80, R3-131180, May 20-24, 2013, ( 4 pages total).
Nokia Siemens Networks, Nokia Corporation, "Re-establishment procedure for carrier aggregation", 3GPP TSG-RAN WG2 Meeting #69, Feb. 22-26, 2010, R2-101114, (3 pages total).
LG Electronics Inc., "Correction to MAC Reset", 3GPP TSG-RAN2 Meeting #63, R2-084174, Aug. 18-22, 2008, (2 pages total).
3rd Generation Partnership Project, Technical Specification Group Radio Access Network, Evolved Universal Terrestrial Radio Access (E-UTRA), Radio Resource Control (RRC),Protocol specification (Release 11), 3GPP TS 36.331 V11.2.0, Jan. 3, 2013, (340 pages total).
3rd Generation Partnership Project, Technical Specification Group Radio Access Network, Evolved Universal Terrestrial Radio Access (E-UTRA), Study on Small Cell Enhancements for E-UTRA and E-UTRAN—Higher layer aspects (Release 12),3GPP TR 36.842 V0.4.0, R2-133732, Oct. 11, 2013, (52 pages total).

* cited by examiner

COMMUNICATION SYSTEM

CROSS REFERENCE TO RELATED APPLICATIONS

This application is a National Stage of International Application No. PCT/JP2014/079009, filed on Oct. 27, 2014, which claims priority from United Kingdom Patent Application No. 1319382.6, filed on Nov. 1, 2013, the contents of all of which are incorporated herein by reference in their entirety.

TECHNICAL FIELD

The present invention relates to a communication system and to components thereof for providing communication services to mobile or fixed communication devices. The invention has particular, but not exclusive, relevance to management of connectivity via multiple base stations in Long Term Evolution (LTE) Advanced systems as currently defined in associated 3rd Generation Partnership Project (3GPP) standards documentation.

BACKGROUND ART

In a cellular communications network, user equipment (UE) (such as mobile telephones, mobile devices, mobile terminals, etc.) can communicate with other user equipment and/or remote servers via base stations. LTE systems include an Evolved Universal Terrestrial Radio Access Network (E-UTRAN) and an Evolved Packet Core (EPC) network (or simply 'core network'). The E-UTRAN includes a number of base stations ('eNBs') for providing both user-plane (e.g. Packet Data Convergence Protocol (PDCP), Radio Link Control (RLC), Medium Access Control (MAC) and PHYsical (PHY) layers) and control-plane (e.g. Radio Resource Control (RRC)) protocol terminations towards the UE.

Conventionally, a mobile telephone is configured to communicate via one base station (using an associated radio link). The mobile telephone can determine (as specified in 3GPP TS 36.331 V11.5.0 section 5.3.11.3) that there is a failure of the radio link between the mobile telephone and a serving base station, by monitoring various parameters associated with communications via that base station. For example, the mobile telephone may monitor for and detect that at least one of the following events has occurred (with respect to a cell of a base station):

RLC retransmission failure;
Random Access Channel (RACH) failure;
PHY problem recovery failure (upon expiry of an associated T310 timer);

In each detected failure situation, the mobile telephone tries to re-establish the (RRC) connection with that base station or another base station (e.g. based on signal quality measurements followed by a cell re-selection procedure).

Further, there may be other problems (that may or may not be indicative of a radio link failure) associated with a base station (e.g. a problem associated with a cell/radio link thereof). Such problems associated with a communication bearer include, for example:

a Scheduling Request (SR) failure (as specified in 3GPP TS 36.321 V11.3.0 section 5.4.4); and
an expiry of an associated Time Alignment Timer (TAT) for a particular Timing Advance Group (TAG) that the mobile telephone 3 belongs to (e.g. the last TAG, a Primary TAG, etc.) as specified in 3GPP TS 36.321 section 5.2.

When the mobile telephone experiences an SR failure and/or a TAT expiry (and/or the like) associated with a communication bearer, it performs a Contention Based Random Access (CBRA) procedure (over an associated RACH) with the base station serving that communication bearer. Once the (RRC) connection with the base station has been re-established (or the CBRA procedure resulted in restoring the connection with that base station), the mobile telephone can be handed over to a different cell (of that base station or a different base station), if appropriate.

However, in extreme cases, e.g. whilst the mobile telephone is carrying out a connection (re-)establishment with a suitable base station, the mobile telephone might not be able to send/receive any data without interruption/delay.

Recent developments in communication networks have seen increased deployment of so called 'small' cells operated by Low Power Nodes (LPNs), such as pico eNBs, femto eNBs, home eNBs (HeNBs) or the like, which cells have a smaller coverage area than existing macro cells operated by a higher power (regular) macro base station. Networks comprising a number of different cell types, for example a network comprising a macro cell and a femto cell, are referred to as Heterogeneous Networks, or HetNets. In the following description the term base station is used to refer to any such macro base station or LPN.

In a study on small cell enhancements for E-UTRA and E-UTRAN (3GPP technical report (TR) no. 36.842 V0.2.0, the contents of which are incorporated herein by reference), a so-called 'dual connectivity' functionality was introduced to improve, for example, the coverage of high data rates for user equipment, temporary network deployment, cell edge throughput and/or to increase system throughput. The dual connectivity feature established techniques for compatible mobile telephones (and other user equipment) to communicate with multiple network points, substantially simultaneously. Specifically, this 'dual connectivity' functionality refers to an operation mode where a given mobile telephone (operating in RRC_CONNECTED mode) consumes radio resources provided by at least two different network points (e.g. two or more base stations). Typically, one of the network points involved in the dual connectivity functionality is a macro base station and the other network point (or a plurality of network points) comprises a low power node (or plurality of low power nodes).

Each network point involved in the provision of dual connectivity for a mobile telephone may assume a different role. One of the network points may be referred to as a master base station (MeNB) and each one of the other network points may be referred to as a secondary base station (SeNB). Typically, the various secondary base stations involved in the provision of dual connectivity are coupled via a so-called non-ideal backhaul. Here, the term 'non-ideal backhaul' may refer to a backhaul between the cell and the core network comprising a communication link provided between a MeNB and the SeNB. Further, in a dual connectivity scenario, one of the base stations (the MeNB) routes control plane signaling to the core network (e.g. to a mobility management entity (MME) in the core network) via an associated interface (e.g. The S1-MME interface), regardless of whether or not the other base station is also connected to the core network for user plane communication (e.g. to a serving gateway via an S1-U interface). Therefore, from the core network/MME perspective, the MeNB acts as a mobility anchor point.

The MeNB/SeNB roles do not necessarily depend on each base station's capabilities/type (e.g. power class) and may be different for different mobile telephones (even when using the same base stations).

In accordance with the dual connectivity functionality, a mapping between the mobile telephone's radio (communication) bearer(s) and the base stations may be realised as follows:

Radio Bearer served by the MeNB only (MeNB-specific bearer);
Radio Bearer served by the SeNB only (SeNB-specific bearer); and
Radio Bearer served by MeNB and SeNB (split bearer).

However, in a dual connectivity scenario difficulties arise in abnormal situations affecting communication with one of the base stations providing the dual connectivity but not the other base station(s) providing the dual connectivity. Such abnormal situations may arise, for example, in the case of a sudden/complete connection loss, unexpected interference, failure to successfully transmit a packet after a predetermined number of retransmission attempts, failure to receive a response after a predetermined number of preamble transmissions/scheduling requests, and/or the like.

SUMMARY OF THE INVENTION

Accordingly, preferred embodiments of the present invention aim to provide methods and apparatus which overcome or at least partially alleviate at least one of the above issues.

In one aspect, the invention provides a mobile communication device for a communication system comprising a core network and a plurality of base stations, the mobile communication device comprising: means for communicating user data substantially simultaneously via a first base station of said plurality of base stations and via a second base station of said plurality of base stations; means for detecting a problem in communications with said second base station; and means for transmitting, to said first base station on detection of a problem in communications with said second base station, an indication of said detected problem in communications with said second base station.

The communicating means might be operable to: i) communicate user data via said first base station over a first communication bearer provided between said mobile communication device and said core network; and ii) communicate user data via said second base station over a second communication bearer provided between said mobile communication device and said core network.

The communicating means might be operable to: i) communicate user data via said first base station over a first radio link provided between said mobile communication device and said first base station of said plurality of base stations; and ii) communicate user data via said second base station over a second radio link provided between said mobile communication device and said second base station of said plurality of base stations.

The detecting means might be operable to detect a problem in communications with said second base station by monitoring communications over said second radio link.

The indication of said detected problem in communications with said second base station might comprise an indication of at least one of: a Radio Link Control (RLC) layer failure; a Media Access Control (MAC) layer failure; a physical layer (PHY) failure; a scheduling request failure; and a Time Alignment Timer (TAT) failure.

The communicating means might be operable to, on detection of a problem in communications with said second base station, suspend or release any radio bearers associated with said second base station. The communicating means might be operable to, on detection of a problem in communications with said second base station, initiate a handover of any radio bearers associated with said second base station to a different base station. The communicating means might be operable to, on detection of a problem in communications with said second base station, suspend or release a MAC entity associated with said second base station. The communicating means might be operable to, on detection of a problem in communications with said second base station, suspend or release at least one serving cell in an associated secondary cell group (SCG) associated with said second base station. The communicating means might be operable to, on detection of a problem in communications with said second base station, release all radio resources associated with said second base station (e.g. Packet Data Convergence Protocol, PDCP/RLC/MAC/physical layer resources).

In one aspect, the invention provides a mobile communication device for a communication system comprising a core network and a plurality of base stations, the mobile communication device comprising: means for communicating user data substantially simultaneously via a first base station of said plurality of base stations and via a second base station of said plurality of base stations; and means for detecting a problem in communications with said second base station; wherein said communicating means is operable to, on detection of a problem in communications with said second base station, carry out at least one of the following actions: suspend or release any radio bearers associated with said second base station; initiate a handover of any radio bearers associated with said second base station to a different base station; suspend or release a Media Access Control (MAC) entity associated with said second base station; suspend or release at least one serving cell in an associated secondary cell group (SCG) associated with said second base station; and release all radio resources associated with said second base station.

In one aspect, the invention provides a base station for a communication system comprising a core network, a further base station and a mobile communication device, the base station comprising: means for communicating with said mobile communication device, said core network, and with the further base station; wherein said means for communicating is operable to receive an indication of a detected problem in communication between said further base station and said mobile communication device; and wherein said means for communicating is operable to transmit, to said core network and responsive to receipt of said indication of a detected problem in communication between said further base station and said mobile communication device, control signaling for initiating release or suspension of a communication bearer provided via said further base station.

The communicating means might be operable to communicate user data for said mobile communication device: i) over a first communication bearer provided between said mobile communication device and said core network; and ii) over a second communication bearer provided between said mobile communication device and said core network via said further base station. The communicating means might be operable to communicate user data for said mobile communication device over a radio link provided between said base station and said mobile communication device.

The communicating means might be operable to terminate a control-plane signaling, with said core network, associated with said communication bearer provided via said further base station. The communicating means might be operable to communicate with said further base station over a non-ideal backhaul (e.g. an 'Xn' interface).

The communication between said further base station and said mobile communication device might comprise communication over a split bearer provided between said base station and said further base station. The split bearer might comprise a connection between a Packet Data Convergence Protocol (PDCP) layer of said base station and a Radio Link Control (RLC) layer of said further base station.

The indication of a detected problem in communication between said further base station and said mobile communication device might comprise an indication of at least one of: a Radio Link Control (RLC) layer failure; a Media Access Control (MAC) layer failure; a physical layer (PHY) failure; a scheduling request failure; and a Time Alignment Timer (TAT) failure associated with a radio link between said further base station and said mobile communication device. The means for communicating might be operable to receive said indication from at least one of said mobile communication device and said further base station.

The means for communicating might be operable to transmit, to said core network and responsive to receipt of said indication of a detected problem in communication between said further base station and said mobile communication device, control signaling for initiating hand over of said communication bearer provided via said further base station to a different base station.

The means for communicating might be operable to transmit, to said mobile communication device and responsive to receipt of said indication of a detected problem in communication between said further base station and said mobile communication device, control signaling for initiating hand over of said communication bearer provided via said further base station to a different base station.

In one aspect, the invention provides a base station for a communication system comprising a core network, a further base station and a mobile communication device, the base station comprising: means for communicating with said mobile communication device, and with the further base station; and means for detecting a problem in communications with said mobile communication device; wherein, on detection of a problem in communications with said mobile communication device, said means for communicating is operable to transmit an indication of the detected problem to said further base station, wherein said indication is configured to cause said further base station to transmit, to said core network, control signaling for initiating release or suspension of a communication bearer provided via said further communication device.

The communicating means might be operable to communicate user data for said mobile communication device over a communication bearer provided between said mobile communication device and said core network via said further base station.

The communicating means might be operable to communicate user data for said mobile communication device over a radio link provided between said base station and said mobile communication device. The communicating means might be operable to communicate with said further base station over a non-ideal backhaul (e.g. an 'Xn' interface).

The communication between said further base station and said mobile communication device might comprise communication over a split bearer provided between said base station and said further base station. The split bearer might comprise a connection between a Packet Data Convergence Protocol (PDCP) layer of said further base station and a Radio Link Control (RLC) layer of said base station.

The indication of the detected problem for communicating might comprise an indication of at least one of: a Radio Link Control (RLC) layer failure; a Media Access Control (MAC) layer failure; a physical layer (PHY) failure; a failure to receive a reference signal; and a Time Alignment Timer (TAT) failure associated with a radio link between said base station and said mobile communication device.

The means for communicating might be operable to receive, from said further base station and responsive to transmitting said indication of the detected problem for communicating, control signaling for initiating handover of said communication bearer to a different base station.

The base station might comprise at least one of a macro base station, a pico base station, a femto base station, and a home base station.

In one aspect, the invention provides a system comprising the above described mobile communication device and at least one of the above described base stations.

In one aspect, the invention provides a mobile communication device for a communication system comprising a core network and a plurality of base stations, the mobile communication device comprising a processor and a transceiver, wherein: said transceiver is configured to communicate user data substantially simultaneously via a first base station of said plurality of base stations and via a second base station of said plurality of base stations; said processor is configured to detect a problem in communications with said second base station; and said transceiver is configured to transmit, to said first base station on detection of a problem in communications with said second base station, an indication of said detected problem in communications with said second base station.

In one aspect, the invention provides a mobile communication device for a communication system comprising a core network and a plurality of base stations, the mobile communication device comprising a processor and a transceiver, wherein: said transceiver is configured to communicate user data substantially simultaneously via a first base station of said plurality of base stations and via a second base station of said plurality of base stations; said processor is configured to detect a problem in communications with said second base station; and said transceiver is configured to, on detection of a problem in communications with said second base station, carry out at least one of the following actions: suspend or release any radio bearers associated with said second base station; initiate a handover of any radio bearers associated with said second base station to a different base station; suspend or release a Media Access Control (MAC) entity associated with said second base station; suspend or release at least one serving cell in an associated secondary cell group (SCG) associated with said second base station; and release all radio resources associated with said second base station.

In one aspect, the invention provides a base station for a communication system comprising a core network, a further base station and a mobile communication device, the base station comprising a transceiver, wherein said transceiver is configured to: communicate with said mobile communication device, said core network, and with the further base station; receive an indication of a detected problem in communication between said further base station and said mobile communication device; and transmit, to said core network and responsive to receipt of said indication of a detected problem in communication between said further base station and said mobile communication device, control signaling for initiating release or suspension of a communication bearer provided via said further base station.

In one aspect, the invention provides a base station for a communication system comprising a core network, a further base station and a mobile communication device, the base station comprising a processor and a transceiver, wherein: said transceiver is configured to communicate with said mobile communication device, and with the further base station; said processor is configured to detect a problem in communications with said mobile communication device; and said transceiver is configured to transmit, on detection of a problem in communications with said mobile communication device, an indication of the detected problem to said further base station, wherein said indication is configured to cause said further base station to transmit, to said core network, control signaling for initiating release or suspension of a communication bearer provided via said further communication device.

In one aspect, the invention provides a method performed by a mobile communication device for a communication system comprising a core network and a plurality of base stations, wherein the mobile communication device is operable to communicate user data substantially simultaneously via a first base station of said plurality of base stations and via a second base station of said plurality of base stations, the method comprising: detecting a problem in communications with said second base station; and transmitting, to said first base station on detection of a problem in communications with said second base station, an indication of said detected problem in communications with said second base station.

In one aspect, the invention provides a method performed by a mobile communication device for a communication system comprising a core network and a plurality of base stations, wherein the mobile communication device is operable to communicate user data substantially simultaneously via a first base station of said plurality of base stations and via a second base station of said plurality of base stations, the method comprising: detecting a problem in communications with said second base station; and performing, on detection of a problem in communications with said second base station, at least one of the following actions: suspending or releasing any radio bearers associated with said second base station; initiating a handover of any radio bearers associated with said second base station to a different base station; suspending or releasing a Media Access Control (MAC) entity associated with said second base station; suspending or releasing at least one serving cell in an associated secondary cell group (SCG) associated with said second base station; and releasing all radio resources associated with said second base station.

In one aspect, the invention provides a method performed by a base station for a communication system comprising a core network, a further base station and a mobile communication device, wherein the base station is operable to communicate with said mobile communication device, said core network, and with the further base station, the method comprising: receiving an indication of a detected problem in communication between said further base station and said mobile communication device; and transmitting, to said core network and responsive to receipt of said indication of a detected problem in communication between said further base station and said mobile communication device, control signaling for initiating release or suspension of a communication bearer provided via said further base station.

In one aspect, the invention provides a method performed by a base station for a communication system comprising a core network, a further base station and a mobile communication device, wherein the base station is operable to communicate with said mobile communication device and with the further base station, the method comprising: detecting a problem in communications with said mobile communication device; and, on detection of a problem in communications with said mobile communication device, an indication of the detected problem to said further base station, wherein said indication is configured to cause said further base station to transmit, to said core network, control signaling for initiating release or suspension of a communication bearer provided via said further communication device.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Embodiments of the invention will now be described, by way of example only, with reference to the attached figures in which.

DETAILED DESCRIPTION OF THE EXEMPLARY EMBODIMENTS

Overview

Figure 1:
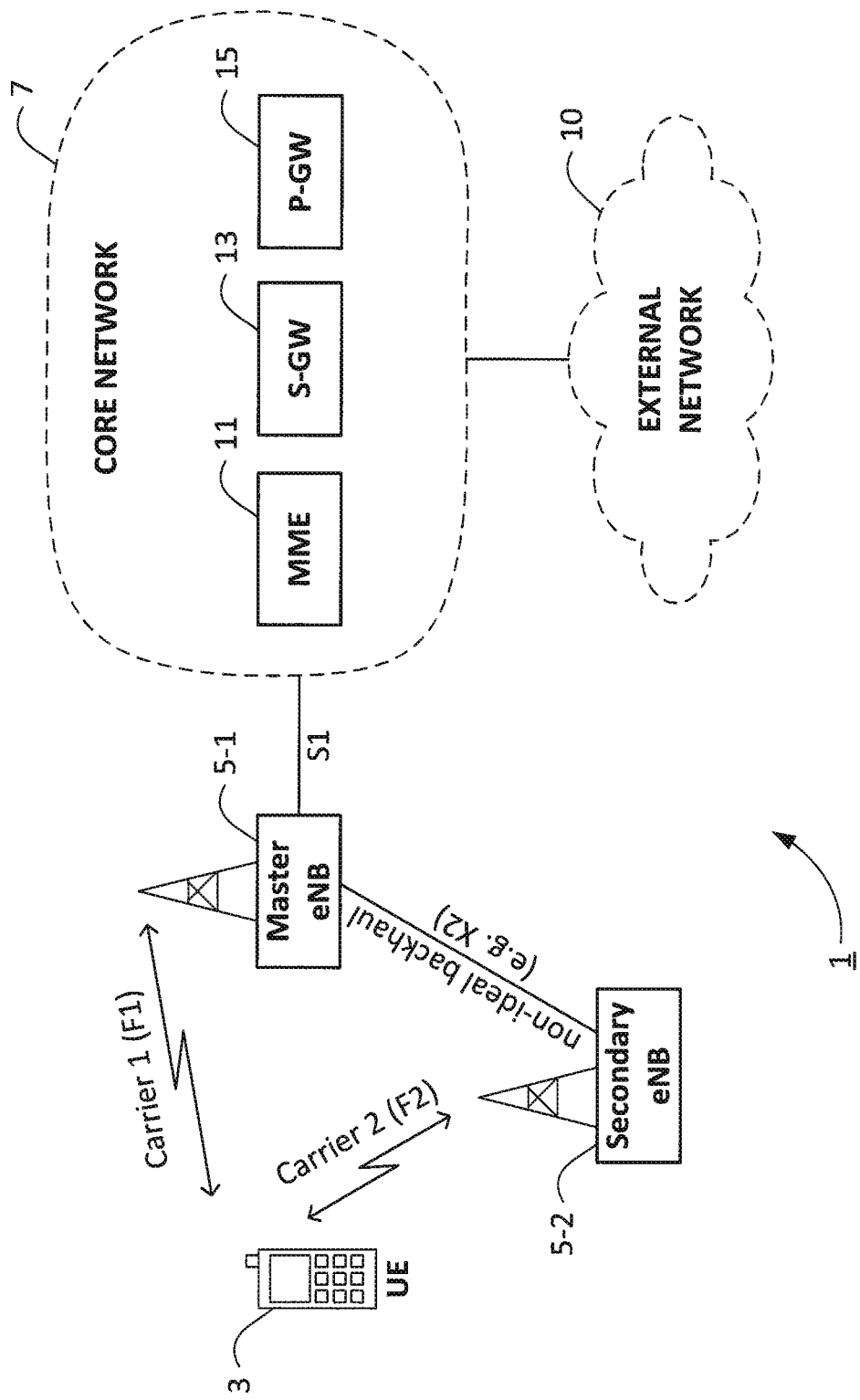
FIG. 1 schematically illustrates a mobile telecommunication system of a type to which the invention is applicable.

FIG. 1 schematically illustrates a mobile (cellular) telecommunication system 1 including a mobile telephone 3 (or other compatible user equipment) served via the base stations 5-1 and 5-2. As those skilled in the art will appreciate, whilst one mobile telephone 3 and two base stations 5 are shown in FIG. 1 for illustration purposes, the system, when implemented, will typically include other base stations and mobile telephones.

The core network 7 comprises, amongst other things, a mobility management entity (MME) 11, a serving gateway (S-GW) 13 and a Packet Data Network (PDN) Gateway (P-GW) 15.

The MME 11 manages general mobility aspects of the mobile telephone 3 and ensures that connectivity is maintained with the mobile telephone 3 as it is moving within the geographical area covered by the communication system (and/or as the mobile telephone 3 is handed over between base stations of the communication system). The MME 11 also handles control-plane signaling for the mobile telephone 3 and manages the various bearers associated with the mobile telephone 3 (e.g. such as an EPS bearer and/or a radio bearer) e.g. by controlling the S-GW 13 and the P-GW 15 (and/or possibly other network nodes) via which such bearers are provided.

The S-GW 13 provides a connection between the mobile telephone 3 and the core network 7 (via the base station 5-1) for sending and receiving user plane data over an associated communication bearer (e.g. an EPS bearer). The communication bearer normally terminates at the P-GW 15, although it is often complemented by an external bearer as well (for example, another EPS bearer and/or the like) between the P-GW 15 and a communication end-point outside the core network 7. It will be appreciated that, whilst shown as separate entities, the functionalities of the S-GW 13 and the P-GW 15 could be implemented in a single gateway element.

As will be understood by those skilled in the art, each base station 5 operates one or more base station cells (not shown) in which communications can be made between the base station 5 and the mobile telephone 3 using one or more suitable communication links (e.g. radio links) provided between the mobile telephone 3 and the respective serving base station 5. Each of said communication links may be carried over one or more associated carriers (F1, F2). A user of the mobile telephone 3 can communicate with other users and/or remote servers via the base stations 5 and the core network 7.

In this system, dual connectivity service is provided for the mobile telephone 3. Therefore, one of the base stations is configured as a master base station (MeNB) 5-1 and the other base station is configured as a secondary base station (SeNB) 5-2. The base stations 5 are connected to each other via an appropriate communication interface (e.g. an 'Xn' or 'X2' interface). Backhaul communication for the SeNB 5-2 is routed via a non-ideal backhaul comprising the interface between the base stations 5.

The MeNB 5-1 is also connected to the core network 7 via an S1 interface in order to provide both user-plane ('S1-U') communication via the S-GW 13 and control-plane ('S1-MME') communication with the MME 11. Although not shown in FIG. 1, the SeNB 5-2 may also have user-plane ('S1-U') connectivity with the core network 7 (other than via the MeNB 5-1) for at least some of its communication bearers (e.g. any SeNB-specific bearers) either directly or via the external network 10.

The mobile telephone 3 may be configured with multiple communication bearers (for example, a first communication bearer for voice, a second communication bearer for video, a third communication bearer for internet data, etc.), e.g. in order to provide different transmission priorities for different services. Data associated with one of the mobile telephone's communication bearers may be transmitted on the same radio link/carrier (although data for different bearers may be transmitted over different radio links/carriers).

In this system, a dual connectivity service can be provided to compatible user equipment using two or more communication bearers (e.g. as specified in 3GPP TR 36.842). Various types of such communication bearers are described below with reference to FIG. 5. In summary, the types of bearers that may be used (in any combination thereof) by the system 1 illustrated in FIG. 1 include at least the following:
- a bearer served by the MeNB only (denoted type 'A' in FIG. 5);
- a bearer served by the SeNB only (denoted type 'C' in FIG. 5); and
- a bearer served by both the MeNB and the SeNB (denoted type 'B' in FIG. 5).

As part of a dual connectivity service, in this example, there are two communication bearers provided for the mobile telephone 3: an MeNB-specific (e.g. a type 'A') communication bearer from the core network 7 via the MeNB 5-1 (over carrier F1); and an SeNB-specific (e.g. a type 'B') communication bearer from the core network 7 via the SeNB 5-2 (over carrier F2) for which (at least) the associated control-plane signaling is routed via a non-ideal backhaul comprising the interface (e.g. Xn/X2 or the like) with the MeNB 5-1.

The communication bearers are managed together, e.g. by the MME 11, as part of the same service (or set of services) for the mobile telephone 3. For example, the two communication bearers may be connected to the same external bearer (via the P-GW 15), e.g. to connect the mobile telephone 3 to a remote communication endpoint (such as a server node and/or another mobile telephone). Thus, for example, when there is a large amount of (downlink) data to be transmitted to the mobile telephone 3, the mobile telephone 3 can benefit from receiving data via both communication bearers (e.g. substantially concurrently and/or in a synchronised fashion over both carriers F1 and F2), which may result in an improved data throughput and/or communication efficiency of the network.

However, in this case, one of the communication bearers is provided via a low power node (e.g. home base station) configured as a SeNB 5-2. As the mobile telephone 3 is changing its geographical location, the signals transmitted by/to the SeNB 5-2 (over carrier F2) may deteriorate relatively more quickly/easily than the signals transmitted by/to the MeNB 5-1 (which comprises a macro base station) over carrier F1. Even when the mobile telephone 3 remains stationary, the SeNB's 5-2 signal are more prone to disruptions/interference than the MeNB's 5-1 signals. Accordingly, there may arise situations when the mobile telephone 3 is not able to communicate (at least momentarily) with the SeNB 5-2.

If the communication problems with the SeNB 5-2 persist, the mobile telephone 3 can determine that the SeNB-specific communication bearer has failed. For example, the mobile telephone 3 monitors for and detects when any of the following events has occurred (with respect to a cell of the SeNB 5-2):
- a predetermined number (e.g. at least one) of RLC retransmission failures;
- a predetermined number (e.g. at least one) of Random Access Channel (RACH) failures;
- a predetermined number (e.g. at least one) of PHY problem recovery failures;
- a predetermined number (e.g. at least one) of Scheduling Request (SR) failures; and
- expiry of an associated Time Alignment Timer (TAT) for a particular Timing Advance Group (TAG) that the mobile telephone 3 belongs to (e.g. the last TAG, a Primary TAG, etc.).

As mentioned above, in this example, the MeNB 5-1 comprises a macro base station having a relatively large coverage area (due to the relatively high power of its transmitted signals). Accordingly, even when the SeNB 5-2

(carrier F2) fails, the mobile telephone 3 is still likely to be able to communicate with the MeNB 5-1 (or more likely to be able to communicate with the MeNB 5-1 than with the SeNB 5-2). Therefore, in this system, the mobile telephone 3 is advantageously configured (e.g. by one of the base stations 5/MME 11) to detect and report, whilst dual connectivity via both base stations 5-1 and 5-2 is being employed, at least some radio link failures associated with the secondary base station 5-2 to the master base station 5-1 (rather than to the secondary base station 5-2 that experienced the failure). Since the MeNB 5-1 and the SeNB 5-2 are connected via a base station to base station interface (Xn/X2/non-ideal backhaul), the MeNB 5-1 can notify the SeNB 5-2 about the mobile telephone's 3 failure with respect to a cell of the SeNB 5-2 and/or manage the SeNB-specific communication bearer (which is also routed via the MeNB 5-1 to SeNB 5-2) accordingly.

Further, in this example, the secondary base station 5-2 is also advantageously configured (e.g. by another network node, such as the MeNB 5-1/MME 11) to detect and report, whilst dual connectivity via both base stations 5-1 and 5-2 is being employed, at least some radio link failures associated with the secondary base station 5-2 to the master base station 5-1.

Specifically, upon detection of a failure (e.g. a radio link failure, a failure of a SR, and/or an expiry of a TAT) associated with the SeNB-specific communication link, the mobile telephone 3 is configured to carry out at least one of the following actions:
  suspend or release any radio bearers served by the SeNB 5-2 (or served only by the SeNB 5-2);
  hand over any radio bearers served by the SeNB 5-2 (or served only by the SeNB 5-2) to another base station (e.g. the MeNB 5-1);
  suspend or release a MAC entity associated with the SeNB 5-2;
  suspend or release all serving cells in an associated secondary cell group (SCG); and
  release all radio resources related to the SeNB 5-2 (i.e. RLC, PDCP, MAC, physical layer resources).

For example, if the mobile telephone 3 detects a radio link failure and/or a failure of a scheduling request for the SeNB 5-2 then, in this example, the mobile telephone 3 advantageously indicates to the network, via the MeNB 5-1, that a problem has been detected with respect to the SeNB-specific communication link provided via the SeNB 5-2. For example, the mobile telephone 3 may send general information (e.g. an indication that such a problem has been detected) and/or detailed information about the problem (e.g. type of problem/failure, affected direction (e.g. UL/DL/both), number of times the problem/failure has been detected, an identification of the affected radio link/bearer/carrier/base station/cell, and/or the like).

Similarly, if the mobile telephone 3 detects an expiry of a time alignment timer ('TAT') for the SeNB 5-2, the mobile telephone 3 advantageously indicates to the MeNB 5-1 that something indicative of a failure (in this case, a TAT expiry) has occurred (possibly also sending the MeNB 5-1 information identifying the SeNB and/or the SeNB-specific communication link associated with the failure).

It will be appreciated that in the event of an expiry of a TAT associated with the SeNB 5-2, the SeNB 5-2 may also be able to detect this event (e.g. by virtue of the same timer having expired at the SeNB 5-2 as well). In a TAT expiry case therefore, the mobile telephone 3 may not send any indication to the MeNB 5-1, e.g. because such indication is (assumed to be) sent by the SeNB 5-2 to the MeNB 5-1 over the base station to base station interface therebetween.

Accordingly, in such cases when the SeNB 5-2 is able to determine the occurrence of problem/failure with respect to the communication link between the SeNB and the mobile telephone 3, the SeNB 5-2 may be configured to inform (over the base station to base station interface) the MeNB 5-1 that a communication failure has occurred (with respect to the SeNB-specific communication link). This advantageously reduces the amount of data to be sent over the air interface between the mobile telephone 3 and the base stations 5 without compromising on the network's ability to overcome such potential communication problems/failures.

In particular, the SeNB 5-2 may be configured to monitor the state of connectivity with the mobile telephone 3, e.g. by monitoring activities (or the absence thereof) over an associated radio link. For example, the SeNB 5-2 may monitor activities over the physical layer, count the number of RLC layer re-transmissions, measure received signal strength, and/or the like. Further, the SeNB 5-2 may be able to determine that the radio link between the SeNB and the mobile telephone 3 has failed, for example, when the mobile telephone 3 does not perform an expected action on time, such as when it fails to send a confirmation (for a message by the SeNB 5-2), fails to send a requested periodic report/signal, fails to transmit any (uplink) data within an allocated resource block, fails to send a sounding reference signal (SRS) within a predefined time window, and/or the like.

Thus, when the SeNB 5-2 determines, based on a monitored parameter/action, that the secondary connectivity has failed, the SeNB 5-2 may inform the MeNB 5-1 (via the interface between them) about the occurrence of the failure. For example, the SeNB 5-2 may send information to the MeNB 5-1 about the type of the failure (e.g. an UL RLF, a physical layer problem, an RLC retransmission failure, TAT expiry, and/or the like).

When the SeNB 5-2 determines that a secondary connectivity (SeNB-specific communication link) with the mobile telephone 3 has failed, the SeNB 5-2 may also trigger (over the base station to base station interface) a secondary connectivity removal procedure with the MeNB 5-1 (rather than sending an explicit indication of the failure). In this case, since the base stations 5-1 and 5-2 are typically peer nodes (i.e. the SeNB 5-2 is not controlled by the MeNB 5-1, other than its dual connectivity functionality), the SeNB 5-2 may be configured to not send any details about the secondary connectivity problem (although the request for secondary connectivity removal may be considered as an implicit indication of such a problem). However, in other examples, the SeNB 5-2 may also send detailed information about the determined secondary connectivity failure (e.g. whether the failure comprises an RLF failure, an RLC retransmission failure, a congestion related failure, and/or the like).

When the MeNB 5-1 has been informed (either directly by the mobile telephone 3 or by the SeNB 5-2 via the base station to base station interface), the MeNB 5-1 proceeds to trigger the removal of the associated secondary connectivity for the mobile telephone 3 (that was provided via the SeNB 5-2).

Therefore, the mobile telephone 3 can beneficially fall back to a single connectivity mode instead of losing all bearers for its dual connectivity, as is often the case when the mobile telephone attempts to communicate with the base station that provides a failed bearer. However, since in this case dual connectivity is provided via the MeNB 5-1 and the SeNB 5-2, the mobile telephone 3 (or the SeNB 5-2) is able to assist the MeNB 5-1 in resolving the communication problem/failure associated with the secondary connectivity (via the SeNB 5-2) by notifying the MeNB 5-1 (which itself does not necessarily experience such a communication problem/failure).

In either case, instead of the triggering an RRC re-establishment and/or a CBRA procedure with the base station that has failed (in this case the SeNB 5-2), the mobile telephone 3 is able to notify the network that via another base station (in this case the MeNB 5-1) that does not experience that failure. This in turn improves the overall efficiency of the utilisation of system resources, especially over the air interface.

Beneficially, there is no need for the mobile telephone 3 to implement a CBRA functionality with regard to the SeNB 5-2 (or with regard to both the MeNB 5-1 and the SeNB 5-2). Further, there is also no need for the SeNB 5-2 to support a CSS functionality. This in turn may result in a reduction of at least the mobile telephone's 3 complexity (and possibly in a reduction of the associated manufacturing costs), since the mobile telephone 3 is not required to perform blind decoding with respect to the cell(s) of the SeNB 5-2 (only with respect to the cell(s) of the MeNB 5-1).

The above approach may be particularly beneficial for improving mobility robustness. For example, an RRC_CONNECTED mobile telephone may experience improved mobility performance in a small cell environment as the mobile telephone is configured to report any communication bearer problem/failure to the master base station (or configured not to report at all) and still remain in the RRC_CONNECTED state (at least via the MeNB) despite the problem/failure.

The above approach also does not increase (and may possibly decrease) the signaling load towards the core network, even in the case when the secondary communication bearer needs to be moved/handed over frequently, because any failure of the secondary communication bearer can be reported sooner/more efficiently compared to other approaches.

Finally, the above approach may also beneficially improve per-user throughput and system capacity, as communication resources that have failed for a particular mobile telephone can be re-allocated to another mobile telephone. There is also no need to provide/use an ideal backhaul between the base stations.

Mobile Telephone

Figure 2:
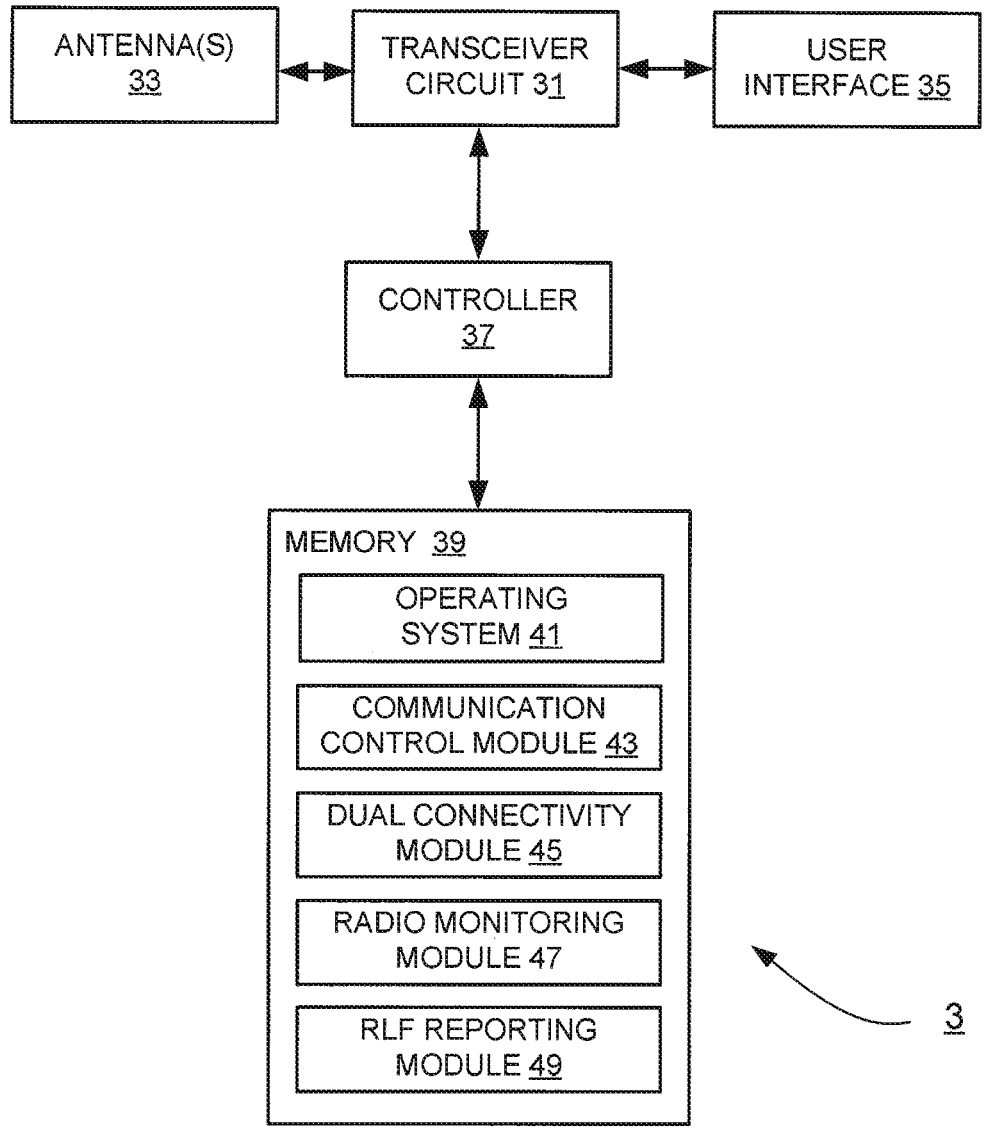
FIG. 2 is a block diagram illustrating the main components of the mobile telephone forming part of the system shown in FIG. 1.

FIG. 2 is a block diagram illustrating the main components of the mobile telephone 3 shown in FIG. 1. As shown, the mobile telephone 3 has a transceiver circuit 31 that is operable to transmit signals to and to receive signals from a base station 5 via one or more antenna 33. The mobile telephone 3 has a controller 37 to control the operation of the mobile telephone 3. The controller 37 is associated with a memory 39 and is coupled to the transceiver circuit 31. Although not necessarily shown in FIG. 2, the mobile telephone 3 may of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within memory 39. As shown, these software instructions include, among other things, an operating system 41, a communication control module 43, a dual connectivity module 45, a radio monitoring module 47, and a radio link failure reporting module 49.

The communication control module 43 controls communications between the mobile telephone 3 and the base station(s) 5. The communication control module 43 also controls the separate flows of uplink data and downlink data and control data to be transmitted to the base station 5 (and other nodes, e.g. the MME 11, via the base station 5).

The dual connectivity module 45 coordinates (with assistance by the communication control module 43) communications over the respective communication bearers forming part of a dual connectivity service. The dual connectivity module 45 also controls communications with the MeNB 5-1 over the associated carrier F1 and communications with the SeNB 5-2 over the associated carrier F2.

The radio monitoring module 47 monitors communication problems occurring with respect to the radio links (e.g. over carriers F1 and F2) with the base stations 5. For example, the radio monitoring module 47 may monitor and register the occurrence of at least one of: an RLC retransmission failure, a RACH failure, a PHY problem recovery failure, an SR failure, and a TAT expiry failure. This information is also made available for the other modules, when appropriate.

The radio link failure reporting module 49 generates and transmits, to the base station 5-1, information indicating that a radio link failure has occurred (when it has been determined by the radio monitoring module 47). The radio link failure reporting module 49 may also transmit detailed information concerning the indicated radio link failure (e.g. when such detailed information has been registered and provided by the radio monitoring module 47).

Master Base Station

Figure 3:
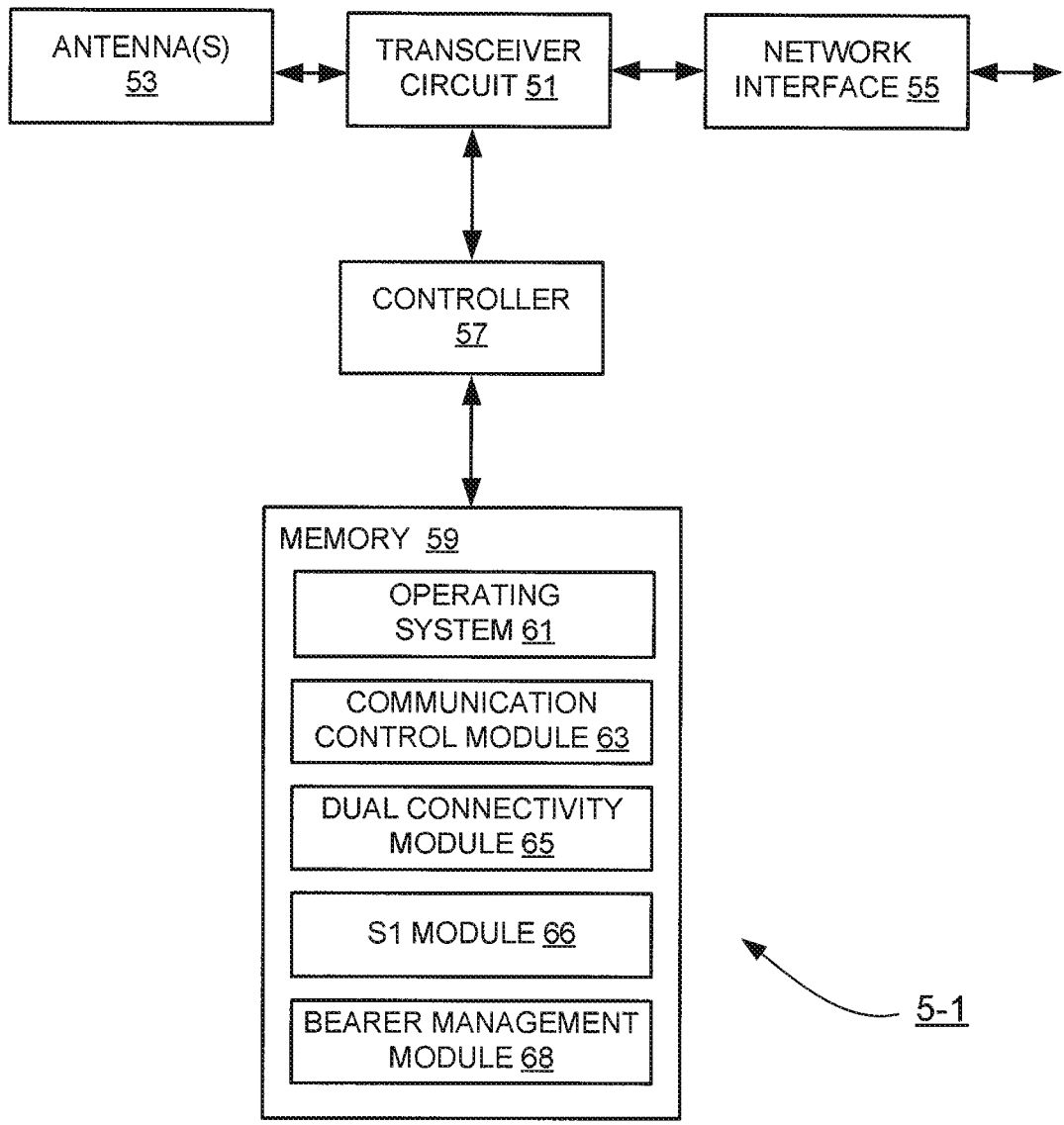
FIG. 3 is a block diagram illustrating the main components of the master base station forming part of the system shown in FIG. 1.

FIG. 3 is a block diagram illustrating the main components of the master base station 5-1 shown in FIG. 1. The master base station 5-1 is a communications node providing services to user equipment 3 within its coverage area. In the embodiments according to the invention, communications between the various base stations 5 and the mobile telephone 3 are coordinated. As shown, the master base station 5-1 includes a transceiver circuit 51 which transmits signals to, and receives signals from, the mobile telephone 3 via at least one antenna 53. The master base station 5-1 also transmits signals to and receives signals from the core network 7 and other neighbouring base stations (e.g. the SeNB 5-2) via a network interface 55 (Xn/X2/non-ideal backhaul interface for communicating with neighbouring base stations and S1 interface for communicating with the core network 7). The operation of the transceiver circuit 51 is controlled by a controller 57 in accordance with software stored in memory 59. The software includes, among other things, an operating system 61, a communication control module 63, a dual connectivity module 65, an S1 interface module 66, and a bearer management module 68.

The communication control module 63 controls communications between the master base station 5-1 and the SeNB 5-2, the mobile telephone 3, and the core network devices.

The dual connectivity module 65 coordinates communications over the respective communication bearers forming part of a dual connectivity service for the mobile telephone 3 served by this base station. The dual connectivity module 65 also controls communications with the mobile telephone 3 over the associated carrier F1 and over the carrier F2 associated with the SeNB 5-2. The dual connectivity module 65 may communicate with corresponding modules of other base stations (e.g. the SeNB 5-2) to ensure that coordination is maintained between the various base stations and may also assist the communication control module 63 to carry out control of communications using dual connectivity services.

The S1 interface module 66 controls communications with the core network 7 entities (via the network interface 55). When a dual connectivity service is in invoked for the mobile telephone 3, the S1 interface module 66 controls the bearer splitting between the MeNB 5-1 and the SeNB 5-2.

The bearer management module 68 manages communication bearers routed via the MeNB 5-1 in order to ensure that an agreed/minimum/acceptable quality of service can be provided for the mobile telephone 3 (and other user equipment served by this base station). The bearer management module 68 also obtains (e.g. from the mobile telephone 3 and/or the SeNB 5-2) information identifying any failure of (and/or a problem associated with) a communication bearer (e.g. the secondary communication bearer) managed by the bearer management module 68. When appropriate, the bearer management module 68 selects a different base station/cell/carrier/radio link for routing the (secondary) communication bearer that has been reported to fail, and also instructs the mobile telephone 3 (possibly involving the MME 11) to hand over/move the affected communication bearer to a different base station/cell/carrier. The bearer management module 68 also requests the secondary base station 5-2 to release the secondary bearer when an associated radio link failure/problem has been reported (by the mobile telephone 3 and/or the SeNB 5-2).

Secondary Base Station

Figure 4:
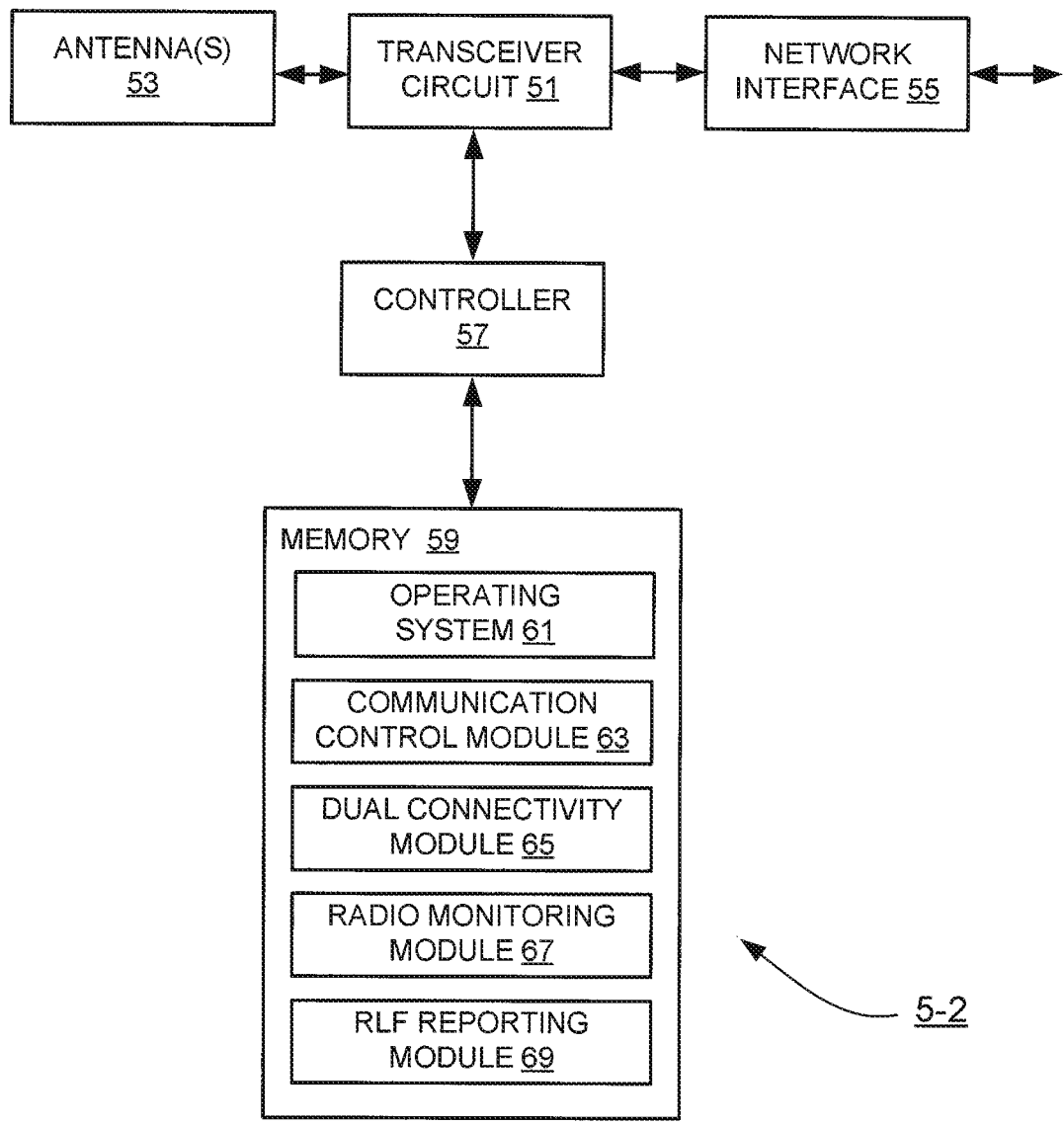
FIG. 4 is a block diagram illustrating the main components of the secondary base station forming part of the system shown in FIG. 1.

FIG. 4 is a block diagram illustrating the main components of the secondary base station 5-2 shown in FIG. 1. The secondary base station 5-2 is a communications node providing services to user equipment 3 within its coverage area. As shown, the secondary base station 5-2 includes a transceiver circuit 51 which transmits signals to, and receives signals from, the mobile telephone 3 via at least one antenna 53. The secondary base station 5-2 also transmits signals to and receives signals from the core network 7 and other neighbouring base stations (e.g. the MeNB 5-1) via a network interface 55 (Xn/X2/non-ideal backhaul interface for communicating with neighbouring base stations and an optional S1 interface for communicating with the core network 7). The operation of the transceiver circuit 51 is controlled by a controller 57 in accordance with software stored in memory 59. The software includes, among other things, an operating system 61, a communication control module 63, a dual connectivity module 65, a radio monitoring module 67, and a radio link failure reporting module 69.

The communication control module 63 controls communications between the secondary base station 5-2 and the MeNB 5-1, the mobile telephone 3, and the core network devices.

The dual connectivity module 65 coordinates communications over the respective communication bearers forming part of a dual connectivity service for the mobile telephone 3 served by this base station. The dual connectivity module 65 also controls communications with the mobile telephone 3 over the associated carrier F2 and communications with the MeNB 5-1 over the base station to base station interface. The dual connectivity module 65 may communicate with corresponding modules of other base stations (e.g. the MeNB 5-1) to ensure that coordination is maintained between the various base stations and may also assist the communication control module 63 to carry out control of communications using dual connectivity services.

The radio monitoring module 67 monitors communication problems occurring with respect to the radio link (e.g. over carrier F2) with the mobile telephone 3. For example, the radio monitoring module 67 may monitor and register the occurrence of at least one of: an RLC retransmission failure, a RACH failure, a PHY problem recovery failure, an SRS failure, and a TAT expiry failure. This information is also made available for the other modules, when appropriate.

The radio link failure reporting module 69 generates and transmits, to the base station 5-1, information indicating that a radio link failure/problem has occurred (when it has been determined by the radio monitoring module 67). The radio link failure reporting module 69 may also transmit detailed information concerning the indicated radio link failure/problem (e.g. when such detailed information has been registered and provided by the radio monitoring module 67).

In the above description, the mobile telephone 3 and the base stations 5 are described for ease of understanding as having a number of discrete modules (such as the communication control modules and the dual connectivity modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different examples will now be described that illustrate how the invention can be put into effect using the mobile telephone 3 and the base stations 5 (as exemplary dual connectivity network points) of FIG. 1.

Dual Connectivity Architecture (User-Plane)

A dual connectivity service can be provided by configuring the mobile telephone 3 to communicate with both the MeNB 5-1 and at least one SeNB 5-2, using respective communication bearers. In this case, there are at least three options for routing the user-plane (S1-U) data:

S1-U terminates at the SeNB 5-2;
S1-U terminates at the MeNB 5-1, no bearer split; and
S1-U terminates at the MeNB 5-1, bearer split is configured.

Figure 5:
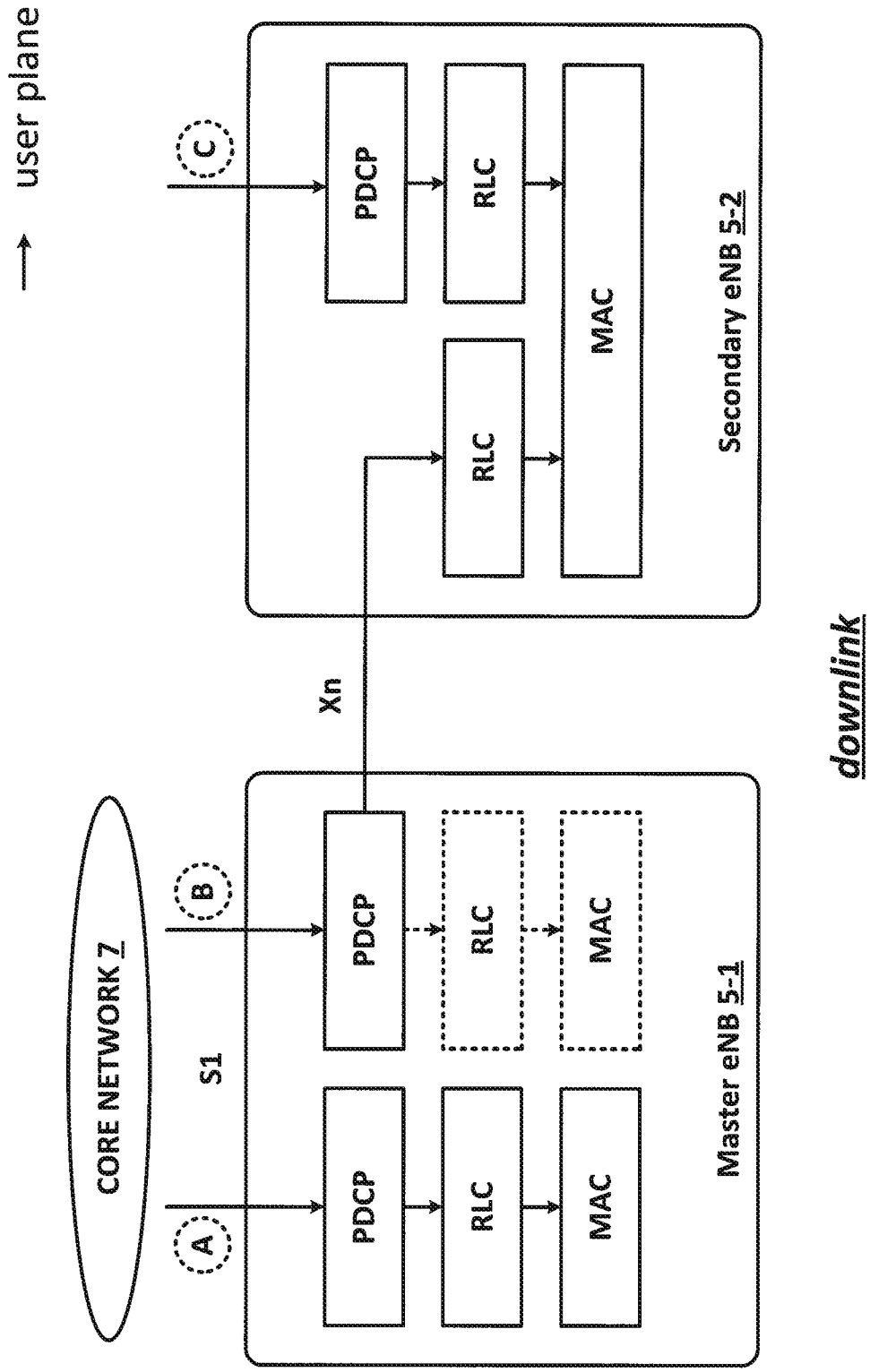
FIG. 5 illustrates an exemplary bearer split configuration according to an embodiment of the present invention.

FIG. 5 illustrates an exemplary bearer split configuration according to an embodiment of the present invention. In FIG. 5, some of the protocol layers implemented by the base stations 5 are omitted for the sake of simplicity. Whilst FIG. 5 illustrates the downlink direction only (as indicated by the arrows), a similar bearer split configuration may be realised for the uplink direction as well, e.g. by reversing the direction of data transmissions, where appropriate.

As can be seen, the S1 control-plane (e.g. 'S1-MME') for the mobile telephone 3 terminates at the MeNB 5-1. Control-plane signaling for the mobile telephone 3 can be exchanged with the SeNB 5-2 via the base station to base station interface (denoted 'Xn' in FIG. 5), when required (although such control-plane signaling may be exchanged between different layers than indicated in FIG. 5).

According to one type of communication bearer configuration (denoted type 'A' in FIG. 5) that may be used in a dual connectivity scenario, the MeNB 5-1 handles the S1 user-plane for a communication bearer (e.g. a communication bearer that is associated with carrier F1 of FIG. 1) associated with the mobile telephone 3.

According to another type of communication bearer configuration (denoted type 'B' in FIG. 5) that may be used in a dual connectivity scenario, a communication bearer (e.g. a communication bearer that is associated with carrier F2 of FIG. 1) may be provided for the mobile telephone 3 via the SeNB 5-2 but also involving the MeNB 5-1. In such indirect case, a bearer split may be realised by connecting the PDCP layer of the MeNB 5-1 to the RLC layer of the SeNB 5-2, via the Xn interface. It will be appreciated that in this case, the MeNB 5-1 may also pass any user-plane data to its own RLC layer as well (as indicated by the dotted arrows and blocks), e.g. for transmitting that data via its own carrier F1 (substantially in parallel with data transmission over Xn and carrier F2).

According to yet another type of communication bearer configuration (denoted type 'C' in FIG. 5) that may be used in a dual connectivity scenario, the SeNB 5-2 (using its own PDCP layer) handles the S1 user-plane for a communication bearer associated with the mobile telephone 3 (e.g. without requiring the user-plane to be routed via the MeNB 5-1, although the MeNB 5-1 may still terminate the associated control-plane and/or process associated control-plane signaling).

In this exemplary architecture, downlink data can be sent from a remote endpoint over an associated communication bearer through the core network 7 (e.g. via the S-GW 13) and received at the PDCP layer of the MeNB 5-1 or the SeNB 5-2, as appropriate. Next, the downlink data is passed to the RLC layer (of the same and/or the other base station, depending on the configuration type used), then to the MAC layer, before it is transmitted to the mobile telephone 3 over the physical layer (not shown).

When dual connectivity is provided for a particular mobile telephone 3, for example, using a communication bearer of type A and another communication bearer of type B, the MeNB 5-1 receives downlink data over two associated communication bearers (as indicated by the two parallel arrows on either sides of the 'S1' label. However, in this case, only downlink data received over one of the associated communication bearers is passed to the MeNB's 5-1 RLC layer (then its MAC/PHY layers for transmission to the mobile telephone 3), whilst any downlink data received over the other (secondary) associated communication bearer is passed to the SeNB's 5-2 RLC layer (for subsequent transmission by the SeNB 5-2). This scenario essentially corresponds to the example given in the overview section with reference to FIG. 1.

Even though the SeNB 5-2 may not be directly connected to the core network 7 for control-plane signaling (at least with respect to a particular mobile telephone's 3 second communication bearer), from the perspective of that mobile telephone 3, core network 7 connectivity is still available via the SeNB 5-2 as well.

Since the mobile telephone 3 (and/or the SeNB 5-2) can identify that dual connectivity is provided, when the mobile telephone 3 (and/or the SeNB 5-2) determines that a problem/failure has occurred with respect to the secondary communication bearer, the mobile telephone 3 (and/or the SeNB 5-2) is configured to inform the MeNB 5-1 about this problem/failure. The MeNB 5-1, based on the received indication of the problem/failure (and/or any additional associated information) from the mobile telephone 3 (and/or from the SeNB 5-2) can decide whether or not to release (or suspend) the secondary bearer for the mobile telephone 3 provided via the SeNB 5-2. If appropriate, the MeNB 5-1 and the mobile telephone 3 can either fall back to a single connectivity mode (i.e. maintain the 'direct' communication bearer via the MeNB 5-1) or move/hand over the secondary communication bearer to another base station/cell.

Operation

In case of a dual connectivity service, a serving cell/base station that is involved in the service can be added/removed depending on overall network conditions (e.g. system load) and capabilities. For example, a serving cell/base station may be added to the set of base stations used by a particular mobile telephone 3 when:
  the mobile telephone supports dual connectivity;
  a measurement report received from the mobile telephone 3 indicates that the radio condition to the SeNB is adequate to meet a required quality of service; and/or
  the mobile telephone may be better served using dual connectivity than normal connectivity (which can be determined based on e.g. the amount/rate of data to be communicated for this mobile telephone).

Similarly, a serving cell/base station may be removed from a set of base stations used by a particular mobile telephone 3 when one or more of the following conditions is/are met:
  a measurement report received from the mobile telephone 3 indicates that the radio condition to the SeNB is inadequate to meet a required quality of service; and
  the mobile telephone no longer needs dual connectivity (which can be determined based on e.g. the amount/rate of data to be communicated for this mobile telephone).

Figure 6:
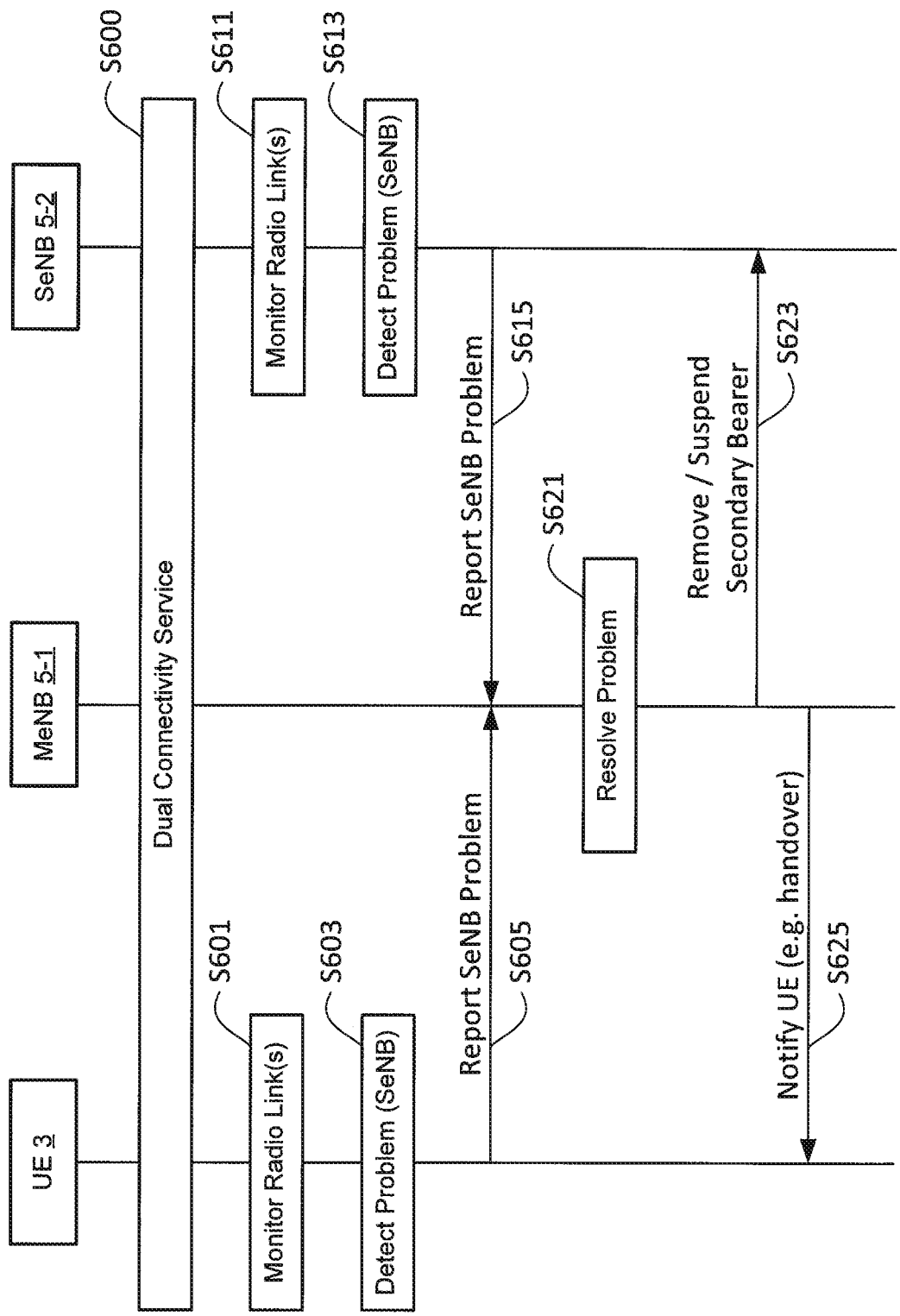
FIG. 6 is an exemplary timing diagram illustrating a method performed by components of the mobile telecommunication system of FIG. 1 whilst carrying out an embodiment of the invention.

FIG. 6 is an exemplary timing diagram illustrating a method performed by components of the mobile telecommunication system of FIG. 1 whilst carrying out an embodiment of the invention.

Initially, as indicated generally at step S600, a dual connectivity service is provided for the mobile telephone 3 via (at least) two base stations. In this case, one of the base stations (e.g. a macro base station) is configured as a MeNB 5-1 and another base station (e.g. a pico base station) is configured as an SeNB 5-2. As part of the dual connectivity service, in this example, there are two communication bearers provided for the mobile telephone 3: an MeNB-specific communication bearer from the core network 7 via the MeNB 5-1 (over carrier F1); and an SeNB-specific communication bearer (which may comprise a split communication bearer) from the core network 7 via the SeNB 5-2 (over carrier F2) for which user plane signaling is routed via a non-ideal backhaul comprising the interface (e.g. Xn/X2) with the MeNB 5-1.

In step S601 (which might comprise a substantially continuous process), the mobile telephone 3 monitors (e.g. using its radio monitoring module 47) for the occurrence of communication problems with respect to the radio links (e.g. over carriers F1 and F2) with the base stations 5-1 and 5-2. For example, the radio monitoring module 47 may monitor and register the occurrence of at least one of:
  a predetermined number (e.g. at least one) of RLC retransmission failures;
  a predetermined number (e.g. at least one) of Random Access Channel (RACH) failures;
  a predetermined number (e.g. at least one) of PHY problem recovery failures;
  a predetermined number (e.g. at least one) of SR failures; and
  a predetermined number (e.g. at least one) of expiry of an associated TAT for a particular TAG that the mobile telephone 3 belongs to (e.g. the last TAG, a Primary TAG, etc.).

A 'radio link failure' may be defined similarly to section 5.3.11.3 of 3GPP TS 36.331, albeit with the following specifics:

The radio monitoring module 47 may determine that an RLC retransmission failure has occurred with respect to the SeNB 5-2 when the RLC layer indicates that a predefined number of retransmissions has been reached from an RLC entity (of the mobile telephone 3) served (only) by SeNB 5-2.

The radio monitoring module 47 may determine that an RACH failure has occurred with respect to the SeNB 5-2 when the MAC layer indicates that a predefined number of (e.g. one) random access problems have been experienced by a MAC entity associated to the SeNB 5-2.

The radio monitoring module 47 may determine that a PHY problem recovery failure has occurred with respect to the SeNB 5-2 when the PHY layer indicates that it has failed to recover from problems associated with communications with the SeNB 5-2 for a predefined number of times (e.g. at least once) and/or upon expiry of an associated T310 timer.

The radio monitoring module 47 may determine that a SR failure has occurred with respect to the SeNB 5-2 when a scheduling request (e.g. for communications over the carrier F2) has been denied by the SeNB 5-2 for a predefined number of times (e.g. at least once).

The radio monitoring module 47 may determine that a TAT expiry failure has occurred with respect to the SeNB 5-2 when an associated TAT for a particular TAG that the mobile telephone 3 belongs to has expired.

In either case, upon detection (at step S603) of the occurrence of one or more of such communication problems, the mobile telephone 3 proceeds to generate (using its radio link failure reporting module 49) and send, at step S605, an appropriately formatted message to the MeNB 5-1. The mobile telephone 3 also includes in this message information indicating that a failure/problem has occurred with respect to the radio link provided via the SeNB 5-2. The mobile telephone 3 may also send the MeNB 5-1 (in the message at S605 or in a separate message) detailed information concerning the indicated failure/problem.

Although not shown in FIG. 6, it will be appreciated that, upon detection of the occurrence of a failure/problem with respect to the radio link provided via the SeNB 5-2, the mobile telephone 3 may also carry out at least one of the following actions:

- suspend or release any radio bearers served by the SeNB 5-2 (or served only by the SeNB 5-2);
- initiate handover of any radio bearers served by the SeNB 5-2 (or served only by the SeNB 5-2) to another base station (e.g. the MeNB 5-1);
- suspend or release a MAC entity associated with the SeNB 5-2;
- suspend or release all serving cells in an associated secondary cell group (SCG); and
- release all radio resources related to the SeNB 5-2 (i.e. RLC, PDCP, MAC, physical layer resources).

Further, as indicated in step S611, the secondary base station 5-2 may also be configured to monitor (e.g. using its radio monitoring module 67) for the occurrence of communication problems with the mobile telephone 3 using the radio link over carrier F2.

Upon the SeNB 5-2 detecting (e.g. using its radio monitoring module 67), at step S613, the occurrence of one or more of such communication problems, the SeNB 5-2 proceeds to generate (using its radio link failure reporting module 69) and send, at step S615, an appropriately formatted message to the MeNB 5-1, informing the MeNB 5-1 that a failure/problem has occurred with respect to the mobile telephone's 3 radio link via the SeNB 5-2. The SeNB 5-2 may also send the MeNB 5-1 (in the message at S615 or in a separate message) detailed information concerning the indicated failure/problem.

When the MeNB 5-1 has been informed (either directly by the mobile telephone 3 at S605 or by the SeNB 5-2 at S615), the MeNB 5-1 proceeds to resolve, at step S612, the indicated radio link failure. In particular, the MeNB 5-1 can trigger the removal/suspension of the associated SeNB-specific communication bearer for the mobile telephone 3. In order to do so, the MeNB 5-1 generates (using its bearer management module 68) and sends an appropriately formatted message to the SeNB 5-2 requesting the SeNB 5-2 to remove/suspend the SeNB-specific communication bearer for the mobile telephone 3. When appropriate, e.g. in case of a termination of the bearer associated with the indicated radio link failure, the MeNB 5-1 also generates (using its 51 module 66) and sends an appropriately formatted message to the MME 11, informing the MME 11 that the SeNB-specific communication bearer for the mobile telephone 3 via SeNB 5-2 has been (is to be) modified.

Finally, in step S625, the MeNB 5-1 also informs the mobile telephone 3 that the SeNB-specific communication bearer for the mobile telephone 3 via SeNB 5-2 has been (is to be) modified. For example, the MeNB 5-1 can inform the mobile telephone that the SeNB-specific communication bearer is to be terminated, suspended, and/or handed over (moved) to a different base station configured as an SeNB.

Therefore, the MeNB 5-1 and the mobile telephone 3 can beneficially fall back to a single connectivity mode or the mobile telephone 3 can continue to use dual connectivity via a different SeNB (and the same MeNB). In either case, instead of the triggering an RRC re-establishment and/or a CBRA procedure, the mobile telephone 3 (and/or the SeNB 5-2) is able to notify the MeNB 5-1 about a detected communication bearer failure. The MeNB 5-1 can thus take an appropriate action for resolving the radio link failure. This in turn improves the overall efficiency of the utilisation of system resources, especially over the air interface.

Modifications and Alternatives

Detailed embodiments have been described above. As those skilled in the art will appreciate, a number of modifications and alternatives can be made to the above embodiments whilst still benefiting from the inventions embodied therein.

In the above examples, the MeNB is described to comprise a macro base station. However, it will be appreciated that the MeNB may comprises any type of base station, e.g. a pico base station, a femto base station, a home base station. Further, it will be appreciated that either of the carriers F1 and/or F2 may be provided via a relay, a remote radio head, and/or the like instead of a base station.

In the above examples, each base station is described to provide a single carrier (F1 or F2). However, it will be appreciated that each base station may provide a plurality of carriers (e.g. the same and/or different set of carriers).

In the above examples, the mobile telephone is described to indicate a secondary bearer failure to the MeNB. However, it will be appreciated that the mobile telephone may indicate a secondary bearer failure to both the MeNB and the SeNB. It will also be appreciated that the mobile telephone may indicate a failure of an MeNB-specific bearer to the SeNB.

It will be appreciated that whilst the above examples are described with reference to specific communication bearer types, the description is equally applicable to any other types of communication bearers, including two or more communication bearers of the same type and/or a 'split' communication bearer (e.g. as specified in 3GPP TR 36.842) being both served directly via the MeNB 5-1, and served via the SeNB 5-2.

In FIG. 5, a bearer split scenario (in which the MeNB's PDCP layer may be connected to the SeNB's RLC layer) is also shown. However, it will be appreciated that the SeNB-specific bearer may be routed, via the MeNB, above the PDCP layer (e.g. without a bearer split). Further, it will be appreciated that the SeNB-specific bearer may be routed below the MeNB's PDCP layer (e.g. directly between the respective RLC layers of the base stations 5-1 and 5-2).

In the above description, dual connectivity is provided for the mobile telephone using at least two communication bearers. However, it will be appreciated that different (e.g. dual and/or single) connectivity may be provided for the uplink (UL) and downlink (DL) directions for the same mobile telephone, using the same or different communication bearers.

In the above embodiments, a mobile telephone based telecommunications system was described. As those skilled in the art will appreciate, the signaling techniques described in the present application can be employed in other communications system. Other communications nodes or devices may include user devices such as, for example, personal digital assistants, laptop/tablet computers, web browsers, etc.

In the embodiments described above, the mobile telephone and the base stations will each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

Glossary of 3GPP Terms:
CBRA—Contention Based Random Access
CSS—Common Search Space
DL—Downlink
eNB—Evolved NodeB, E-UTRAN base station
EPC—Evolved Packet Core
EPS—Evolved Packet System
E-UTRA—Evolved UMTS Terrestrial Radio Access
E-UTRAN—Evolved UMTS Terrestrial Radio Access Network
LTE—Long Term Evolution (of UTRAN)
MAC—Media Access Control
MeNB—Master eNB
MME—Mobility Management Entity
NAS—Non-Access-Stratum
OAM—Operation And Maintenance
PDCP—Packet Data Convergence Protocol
PHY—Physical Layer (L1)
P-GW—PDN Gateway
PTAG—Primary Timing Advance Group
RACH—Random Access Channel
RB—Resource Block
RLC—Radio Link Control
RRC—Radio Resource Control
S1-MME—S1 for the control plane
S1-U—S1 for the user plane
SeNB—Secondary eNB
S-GW—Serving Gateway
SR—Scheduling Request
SRS—Sounding Reference Signal
TA—Timing Advance
TAG—Timing Advance Group
TAT—Time Alignment Timer
UE—User Equipment
UL—Uplink This application is based upon and claims the benefit of priority from United Kingdom patent application No. 1319382.6, filed on Nov. 1, 2013, the disclosure of which is incorporated herein in its entirety by reference.

The invention claimed is:

1. A user equipment (UE), the UE comprising:
a memory storing instructions;
one or more processors configured to execute the instructions stored in the memory to:
communicate user data, in a dual connectivity (DC) in which the UE is connected to a master base station and a secondary base station; and
detect a radio link failure for a secondary cell group (SCG); wherein,
on detection of the radio link failure for the SCG, the one or more processors are further configured to initiate a procedure to report the radio link failure for the SCG, upon initiating the procedure the one or more processors are further configured to suspend at least one SCG communication bearer associated with the SCG, the suspended at least one SCG communication bearer being a communication bearer having protocols located in a secondary base station operating a secondary cell but not in the master base station, and the secondary base station is connected directly with a serving gateway (S-GW) in a core network, and to provide an indication of a failure type, wherein said indication of a failure type is configurable to indicate any one of at least the following: a timer has expired, a random access problem, or a maximum number of Radio Link Control (RLC) retransmissions has been reached.

2. The UE according to claim 1, wherein the instructions for communicating user data are operable to: i) receive said user data via the master base station via a first communication bearer provided between said UE and the core network; and ii) receive user data via said SCG using a second communication bearer provided between said UE and said core network.

3. The UE according to claim 1, wherein the instructions for detecting a communications failure are operable to detect the radio link failure for the SCG.

4. The UE according to claim 1, wherein the instructions for communicating user data are operable to, upon initiating the procedure, initiate a handover of at least one communication bearer associated with the SCG.

5. The UE according to claim 1, wherein the instructions for communicating user data are operable to, upon initiating the procedure, suspend or release a MAC entity associated with said SCG.

6. The UE according to claim 1, wherein the instructions for communicating user data are operable to, upon initiating the procedure, suspend or release at least one serving cell in the SCG.

7. The UE according to claim 1, wherein the instructions for communicating user data are operable to, upon initiating the procedure, release radio resources for associated SCG communications.

8. The UE according to claim 1, wherein the master base station is a master eNB.

9. The UE according to claim 1, wherein the at least one cell of the SCG is operated by a secondary eNB.

10. A method performed by a user equipment (UE), the method comprising:
   communicating user data, in a dual connectivity (DC) in which the UE is connected to a master base station and a secondary base station; and
   detecting a radio link failure for a secondary cell group (SCG);
   wherein on detection of the radio link failure for the SCG, the UE initiates a procedure to report the radio link failure the SCG and upon initiating the procedure, the UE suspends at least one SCG communication bearer associated with the SCG, the suspended at least one SCG communication bearer being a communication bearer having protocols located in a secondary base station operating a secondary cell but not in the master base station, and the secondary base station is connected directly with a serving gateway (S-GW) in a core network, and provides an indication of a failure type, wherein said indication of a failure type is configurable to indicate any one of at least the following: a timer has expired, a random access problem, or a maximum number of Radio Link Control (RLC) retransmissions has been reached.

11. A non-transitory computer readable medium having stored thereon software instructions that, when executed by a processor, cause the processor to perform a method according to claim 10.

* * * * *